(12) United States Patent
Zheng et al.

(10) Patent No.: US 12,433,833 B2
(45) Date of Patent: Oct. 7, 2025

(54) COMPOSITION FOR MAKEUP REMOVAL AND METHODS FOR PREPARING, PACKAGING, AND USING SAME, AND MAKEUP REMOVING GEL

(71) Applicant: Cosbe Laboratory Inc., Shantou (CN)

(72) Inventors: Songwu Zheng, Shantou (CN); Xiaofan Chen, Shantou (CN); Zehua Zhao, Shantou (CN); Yanxiong Zhang, Shantou (CN); Xiazhi Huang, Shantou (CN)

(73) Assignee: Cosbe Laboratory Inc., Shantou (CN)

( * ) Notice: Subject to any disclaimer, the term of this patent is extended or adjusted under 35 U.S.C. 154(b) by 0 days.

(21) Appl. No.: 18/930,999

(22) Filed: Oct. 29, 2024

(65) Prior Publication Data
US 2025/0090444 A1 Mar. 20, 2025

Related U.S. Application Data

(63) Continuation of application No. PCT/CN2023/090341, filed on Apr. 24, 2023.

(30) Foreign Application Priority Data

Apr. 29, 2022 (CN) .......................... 202210462075.6

(51) Int. Cl.
*A61K 8/73* (2006.01)
*A61K 8/44* (2006.01)
*A61K 8/46* (2006.01)
*A61K 8/81* (2006.01)
*A61Q 1/14* (2006.01)

(52) U.S. Cl.
CPC ................ *A61K 8/731* (2013.01); *A61K 8/44* (2013.01); *A61K 8/463* (2013.01); *A61K 8/466* (2013.01); *A61K 8/735* (2013.01); *A61K 8/8147* (2013.01); *A61Q 1/14* (2013.01); *A61K 2800/87* (2013.01)

(58) Field of Classification Search
CPC ............ A61K 2800/08; A61K 2800/48; A61K 2800/596; A61Q 1/14
USPC .......................................................... 514/57
See application file for complete search history.

(56) References Cited

U.S. PATENT DOCUMENTS

2007/0071700 A1* 3/2007 Abhimanyu Patil .. A61Q 19/00
525/440.03
2021/0283030 A1* 9/2021 Asirvatham ............. A61K 8/41

FOREIGN PATENT DOCUMENTS

| CN | 107582498 A | 1/2018 | |
|---|---|---|---|
| CN | 109641138 A | 4/2019 | |
| CN | 112618444 A | 4/2021 | |
| WO | WO 2017/189493 A1 * | 11/2017 | ............... A61Q 1/14 |

OTHER PUBLICATIONS

Abhay et al, Cosmetics, 2014, 1, 159-170.*

* cited by examiner

*Primary Examiner* — Ganapathy Krishnan
(74) *Attorney, Agent, or Firm* — Nitin Kaushik

(57) ABSTRACT

A composition for makeup removal comprises, in parts by weight, the following components: 15-30 parts of a thickening agent, 10-30 parts of sodium methyl cocoyl taurate, 10-50 parts of sodium lauroyl glutamate, 5-10 parts of sodium lauryl sulfate, 20-30 parts of a filling agent, 1-5 parts of microcrystalline cellulose, 0.1-0.2 parts of sodium hyaluronate, 0.3-0.5 parts of essence, and 0-0.5 parts of pigment.

6 Claims, 4 Drawing Sheets

Before makeup removal

During makeup removal

After makeup removal

Before makeup removal

During makeup removal

After makeup removal

Before makeup removal

During makeup removal

After makeup removal

COMPOSITION FOR MAKEUP REMOVAL AND METHODS FOR PREPARING, PACKAGING, AND USING SAME, AND MAKEUP REMOVING GEL

CROSS-REFERENCE TO RELATED APPLICATIONS

The application claims priority to Chinese patent application No. 202210462075.6, filed on Apr. 29, 2022, the entire contents of which are incorporated herein by reference.

TECHNICAL FIELD

The present invention relates to the technical field of daily necessities, and in particular, to a composition for makeup removal and methods for preparing, packaging, and using the same, and a makeup removing gel.

BACKGROUND

Nowadays, with the improvement of people's living standards, makeup has become a part of daily life for more and more women. However, if the makeup is not removed thoroughly and remains on the face for a long time, it will block skin pores and affect skin breathing, thus leading to a series of skin disorders and accelerating skin aging.

Currently, there are many types of makeup removing products available on the market, mainly including makeup removing water, makeup removing oil, makeup removing lotion, makeup removing cream, etc., among which makeup removing water and makeup removing oil exist in liquid form and are easily lost if handled carelessly. Moreover, when applied on the face, makeup removing oil is easy to drip and may stain clothes due to its low viscosity, making it inconvenient to use. In addition, makeup removing water and makeup removing oil are also prone to leakage and troublesome when carried for a vacation tour or a business trip due to their dosage forms, and they cannot be carried on airplanes if oversized.

Although makeup removing lotion and makeup removing cream can solve the above problems, such products contain very few moisturizing and emollient ingredients, possibly leading to dryness and peeling after makeup removal. Due to their poor skin-friendliness, they may result in dry skin and coarse pores. Moreover, it is easy to overuse them, thereby causing damage to the skin barrier.

Additionally, existing makeup removing products usually need to be used with makeup removing pads to remove makeup with the aid of friction; otherwise, it is difficult to wipe off most of the makeup, which is inconvenient to use and has limited cleaning power. Afterwards, cleansing products have to be further used to clean the dirt, or else it will be difficult to clean. Such repeated cleaning will put a great burden on the skin, destroy the skin's natural barrier, and affect the skin's moisture and elasticity. Particularly, for stubborn makeup, it has to be wiped off repeatedly with makeup removing pads, which may easily cause skin redness, pain, peeling, and other phenomena after makeup removal, further leading to other skin disorders which may endanger skin health and beauty.

In addition, existing makeup removing products not only have complex preparation processes and high production costs but are also mostly filled in containers and bottles. Once they are unsealed for a long time, many effective substances will volatilize, and bacteria in the air will also enter. The longer they are unsealed, the more unhygienic they become.

In conclusion, how to provide a makeup removing product that not only has multiple functions such as cleaning, moisturizing, exfoliating, and makeup removal but also is easy to prepare has become an urgent problem to be solved. By applying an appropriate amount of the product on the face and massaging the face, the product will quickly melt and spread under body temperature, achieving a perfect makeup removal effect while cleansing the face.

SUMMARY

In view of the aforementioned problems existing in the prior art, the present invention provides a composition for makeup removal and methods for preparing, packaging, and using the same, and a makeup removing gel. The composition for makeup removal according to the present invention uses microcrystalline cellulose as scrub particles and is prepared with sodium methyl cocoyl taurate, sodium lauroyl glutamate, sodium lauryl sulfate, a thickening agent, a filling agent, sodium hyaluronate, essence, and pigment. The makeup removing gel according to the present invention is prepared by mixing 1-2 parts of the composition for makeup removal according to the present invention and 10-20 parts of water. The scrub particles of the makeup removing gel according to the present invention are moderate in size and have a desirable scrub feel. While directly and gently removing makeup by wiping without the need for rubbing with makeup removing pads, it also has multiple skin care effects such as cleaning and moisturizing, making the skin healthy, smooth, and glossy.

At the same time, the present invention further provides methods for preparing, packaging, and using the composition for makeup removal.

The composition for makeup removal according to the present invention includes, in parts by weight, the following components: 15-30 parts of a thickening agent, 10-30 parts of sodium methyl cocoyl taurate, 10-50 parts of sodium lauroyl glutamate, 5-10 parts of sodium lauryl sulfate, 20-30 parts of a filling agent, 1-5 parts of microcrystalline cellulose, 0.1-0.2 parts of sodium hyaluronate, 0.3-0.5 parts of essence, and 0-0.5 parts of pigment.

Preferably, the composition for makeup removal includes, in parts by weight, the following components: 20-25 parts of the thickening agent, 15-25 parts of sodium methyl cocoyl taurate, 20-30 parts of sodium lauroyl glutamate, 6-8 parts of sodium lauryl sulfate, 23-27 parts of the filling agent, 2-4 parts of microcrystalline cellulose, 0.1-0.2 parts of sodium hyaluronate, 0.3-0.4 parts of essence, and 0-0.1 parts of pigment.

Preferably, the thickening agent is selected from at least one of sodium polyacrylate and sodium polyacrylate grafted with starch.

Preferably, the filling agent is selected from at least one of magnesium sulfate, sodium sulfate, and urea.

In addition, the present invention further provides a method for preparing the composition for makeup removal, including:

S1: adding sodium methyl cocoyl taurate, sodium lauroyl glutamate, sodium lauryl sulfate, the filling agent, sodium hyaluronate, essence, and pigment in measured parts by weight into a high-speed disperser with a cooling jacket, and stirring them evenly to obtain a phase-A mixture;

S2: adding the thickening agent and microcrystalline cellulose in measured parts by weight into the phase-A mixture and stirring them evenly to obtain a phase-B mixture; and S3: moving the phase-B mixture into a constant temperature and humidity chamber at 25-28° C., 45-50% RH for dehumidification for 12-24 h to obtain the composition for makeup removal.

Preferably, the stirring speed in the S1 is 1,000-1,500 r/min, and the stirring time is 1-5 min.

Preferably, the stirring speed in the S2 is 10-20 r/min, and the stirring time is 1-5 min.

The present invention further provides a method for packaging the composition for makeup removal, including: storing the composition for makeup removal in a sealed bag. Preferably, the sealed bag is a water-soluble bag sealed on three sides.

The present invention further provides a method for using the composition for makeup removal, including: mixing the composition for makeup removal with water at a mass ratio of 1:10-1:15 in a container to obtain a mixture, applying the mixture on areas where makeup removal is required, gently massaging the areas to remove makeup and exfoliate the areas, and finally rinsing the areas with water.

In addition, the present invention further provides a makeup removing gel containing the composition for makeup removal, prepared by evenly mixing, in parts by weight, 1-2 parts of the composition for makeup removal and 10-20 parts of water to form a gel with a density of 1.0-1.05 g/cm$^2$.

Unless otherwise specified, the raw materials used in the present invention are commercially available or can be prepared by conventional technical means in the art.

Compared with the prior art, the present invention has the following beneficial effects:

(1) by using microcrystalline cellulose instead of conventional polyethylene particles as scrub particles, the composition for makeup removal according to the present invention provides a comfortable scrub texture and higher environment-friendliness, avoids impact on water, and solves the problem that walnut particles or other solid particles may easily cause skin scratches or allergies due to their sharp edges after crushing; in addition, the composition for makeup removal according to the present invention does not contain preservatives but mainly amino acid surfactants, thereby more suitable for sensitive skin due to its mild and non-irritating formula;

(2) the makeup removing gel according to the present invention has a novel appearance, can spread quickly when it contacts the skin and easily and quickly clean makeup on the skin, and has dual functions of makeup removal and moisturizing, thereby providing a better moisturizing effect and making the skin moisturized and glossy;

in addition, the present invention controls the pH value of the makeup removing gel within the range of 5.5-6.0, which is closer to the pH value of human skin, thereby causing no irritation or discomfort to the skin after use;

(3) the composition for makeup removal according to the present invention contains neither water nor oil, is highly concentrated, and can be packaged in environment-friendly water-soluble sealing bags, which are convenient to carry, reduce transport costs, and have good stability;

in addition, the method of using the composition for makeup removal according to the present invention is relatively novel and can bring a pleasant use experience to consumers; and (4) the preparation method of the present invention is easy to operate and environment-friendly since it does not require heating or cooling procedures during raw material processing and molding, and the preparation process is simple and practical, and has low requirements for equipment and the preparation site; therefore, it is convenient for production and has low costs, and can be used for large-scale production. Moreover, the composition for makeup removal prepared by the method can be used effectively against external pollution.

BRIEF DESCRIPTION OF THE DRAWINGS

To describe the technical solutions in the embodiments of the present application more clearly, the following briefly describes the accompanying drawings required for describing the embodiments. It should be understood that the following accompanying drawings only show some embodiments of the present application, and therefore should not be regarded as a limitation on the scope. Those of ordinary skill in the art may still derive other related drawings according to these accompanying drawings without creative efforts.

DETAILED DESCRIPTION OF THE EMBODIMENTS

Figure 1:
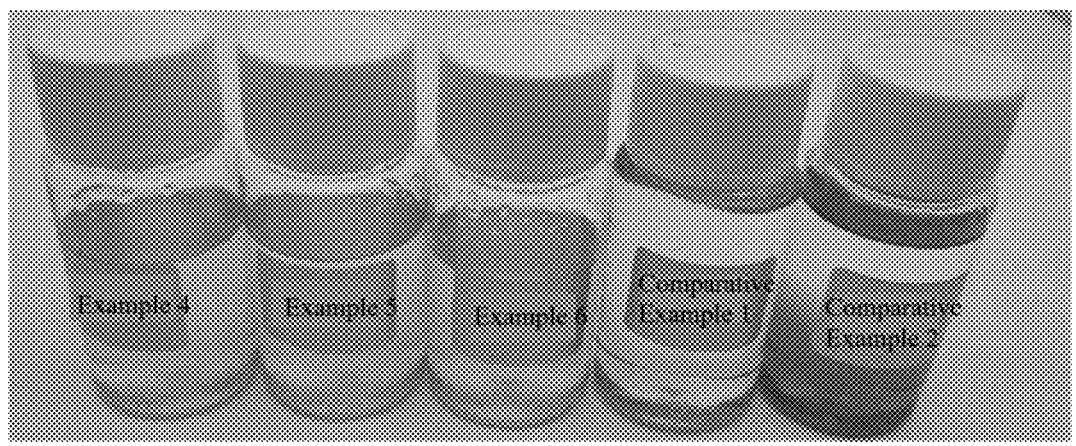
FIG. 1 shows appearances of makeup removing gel products prepared in Examples 4-6 and makeup removing products provided in Comparative Examples 1 and 2.

In order to easily understand the technical means, creative features, objectives, and efficacy achieved by the present invention, the present invention will be further described below in combination with embodiments.

Examples 1-3 a composition for makeup removal, including the following components: sodium polyacrylate, sodium methyl cocoyl taurate, sodium lauroyl glutamate, sodium lauryl sulfate, urea, microcrystalline cellulose, sodium hyaluronate, essence, Pigment Blue 1, and deionized water, all of which are commercially available.

The components of the composition for makeup removal in Examples 1-3 and their corresponding masses are shown in Table 1.

TABLE 1

Content in Parts by Weight of Each Component of the
Composition for Makeup Removal in Examples 1-3

| No. | Component | Example 1 | Example 2 | Example 3 |
|---|---|---|---|---|
| 1 | Sodium polyacrylate | 15 | 15 | 15 |
| 2 | Sodium methyl cocoyl taurate | 20 | 20 | 20 |
| 3 | Sodium lauroyl glutamate | 30 | 30 | 30 |
| 4 | Sodium lauryl sulfate | 7.5 | 7.5 | 7.5 |
| 5 | Urea | 25.999 | 25.999 | 25.999 |
| 6 | Microcrystalline cellulose | 1 | 1 | 1 |
| 7 | Sodium hyaluronate | 0.2 | 0.2 | 0.2 |
| 8 | Essence | 0.3 | 0.3 | 0.3 |
| 9 | Pigment | 0.001 | 0.001 | 0.001 |

The preparation methods of the composition for makeup removal in Examples 1-3 all use the following processing steps to produce the product:

S1: adding sodium methyl cocoyl taurate, sodium lauroyl glutamate, sodium lauryl sulfate, urea, sodium hyaluronate, essence, and pigment in Examples 1-3 in measured parts by weight into a high-speed disperser with a cooling jacket, stirring them evenly for 1-2 min at room temperature and a speed of 1000-1500 r/min, and adjusting the color of the product to obtain a phase-A mixture;

S2: adding sodium polyacrylate and microcrystalline cellulose in Examples 1-3 in measured parts by weight into the phase-A mixture and stirring them evenly for 1-2 min at room temperature and a speed of 10-20 r/min to obtain a phase-B mixture; and S3: moving the phase-B mixture into a constant temperature and humidity chamber at 25-28° C., 45-50% RH for dehumidification for 12-24 h, and performing inspection on the product to obtain the composition for makeup removal in Examples 1-3.

Examples 4-6 a makeup removing gel, prepared by mixing the composition for makeup removal in Examples 1-3 and water.

The components of the makeup removing gel products in Examples 4-6 and their corresponding masses are shown in Table 2.

TABLE 2

Content in Parts by Weight of Each Component of
the Makeup Removing Gel Products in Examples 4-6

| No. | Component | Example 4 | Example 5 | Example 6 |
|---|---|---|---|---|
| 1 | Composition for makeup removal in Example 1 | 1 | — | — |
| 2 | Composition for makeup removal in Example 2 | — | 2 | — |
| 3 | Composition for makeup removal in Example 3 | — | — | 1.5 |
| 4 | Deionized water | 10 | 20 | 15 |

The following tests were conducted on the composition for makeup removal in Examples 1-3 and the makeup removing gel in Examples 4-6 prepared by the aforementioned methods, with a commercially available ordinary oil-based makeup removing product (mainly containing olive oil, caprylic/capric triglyceride, PEG-30 sorbitan tetraoleate, sunflower seed oil, and tocopherol) as Comparison Example 1 and a commercially available ordinary water-oil double makeup removing product (mainly containing water, transdermal repair peptide, phenoxyethanol, ethylhexylglycerin, propylene glycol, trimethylolpropane trioctyl/tridecanoate, and essence) as Comparative Example 2.

FIG. 1 shows appearances of makeup removing gel products prepared in Examples 4-6 and appearances of makeup removing products provided in Comparative Examples 1 and 2. It can be seen from FIG. 1 that the makeup removing gel in Example 4 has a gel-like appearance, the ordinary oil-based makeup removing product in Comparative Example 1 has an oily appearance and is slightly greasy, and the ordinary water-oil double makeup removing product in Comparative Example 2 has a water-oil double-layer appearance, with the lower layer being oil and the upper layer being water.

Stability Test:

a stability test was conducted on the composition for makeup removal in Examples 1-3 and the makeup removing products in Comparative Examples 1-2 as follows: each of the composition and the products (contents) was put into a 30-mL PE bag with a label indicating the product name, formula number, test conditions, test date, and other information; then, the bags were placed under 0° C., 25° C., 37° C., 46° C., and 55° C., and in F.L.light and U.V.light biochemical incubators for thermal stability testing; the changes in the appearance and smell of each of the composition and the products were observed and recorded at 24 h, 1 week, 2 weeks, 4 weeks, 8 weeks, and 12 weeks (returned to room temperature). The test results are shown in Table 3.

TABLE 3

Stability Test Results of the Composition for Makeup Removal in Examples
1-3 and the Makeup Removing Products in Comparative Examples 1-2

| | | | Test item | | | | | | | |
|---|---|---|---|---|---|---|---|---|---|---|
| | | | Texture | | | | | Color | | |
| Time interval | Condition | Test temperature | Example 1 | Example 2 | Example 3 | Comparative Example 1 | Comparative Example 2 | Example 1 | Example 2 | Example 3 |
| Initial test condition | | 77° F./25° C. | Pass | Pass | Pass | Pass | Pass | Light Blue | Light Blue | Light Blue |
| 1 week | 0° C. | 77° F./25° C. | 0 | 0 | 0 | 0 | 0 | 0 | 0 | 0 |

TABLE 3-continued

Stability Test Results of the Composition for Makeup Removal in Examples 1-3 and the Makeup Removing Products in Comparative Examples 1-2

| Time interval | Condition | | | | | | | | | |
|---|---|---|---|---|---|---|---|---|---|---|
| | 25° C. | 77° F./25° C. | 0 | 0 | 0 | 0 | 0 | 0 | 0 | 0 |
| | 37° C. | 77° F./25° C. | 0 | 0 | 0 | 0 | 0 | 0 | 0 | 0 |
| | 46° C. | 77° F./25° C. | 0 | 0 | 0 | 0 | 0 | 0 | 0 | 0 |
| | 55° C. | 77° F./25° C. | 0 | 0 | 0 | 0 | 0 | 0 | 0 | 0 |
| | F.L. light | 77° F./25° C. | 0 | 0 | 0 | 0 | 0 | 0 | 0 | 0 |
| | U.V. lighe | 77° F./25° C. | 0 | 0 | 0 | 0 | 0 | 0 | 0 | 0 |
| 2 weeks | 0° C. | 77° F./25° C. | 0 | 0 | 0 | 0 | 0 | 0 | 0 | 0 |
| | 25° C. | 77° F./25° C. | 0 | 0 | 0 | 0 | 0 | 0 | 0 | 0 |
| | 37° C. | 77° F./25° C. | 0 | 0 | 0 | 0 | 0 | 0 | 0 | 0 |
| | 46° C. | 77° F./25° C. | 0 | 0 | 0 | 0 | 0 | 0 | 0 | 0 |
| | 55° C. | 77° F./25° C. | 0 | 0 | 0 | 0 | 0 | 0 | 0 | 0 |
| | F.L. light | 77° F./25° C. | 0 | 0 | 0 | 0 | 0 | 0 | 0 | 0 |
| | U.V. lighe | 77° F./25° C. | 0 | 0 | 0 | 0 | 0 | 0 | 0 | 0 |
| 4 weeks | 0° C. | 77° F./25° C. | 0 | 0 | 0 | 0 | 0 | 0 | 0 | 0 |
| | 25° C. | 77° F./25° C. | 0 | 0 | 0 | 0 | 0 | 0 | 0 | 0 |
| | 37° C. | 77° F./25° C. | 0 | 0 | 0 | 0 | 0 | 0 | 0 | 0 |
| | 46° C. | 77° F./25° C. | 0 | 0 | 0 | 0 | 0 | 0 | 0 | 0 |
| | 55° C. | 77° F./25° C. | 0 | 0 | 0 | 0 | 0 | 0 | 0 | 0 |
| | F.L. light | 77° F./25° C. | 0 | 0 | 0 | 0 | 0 | 0 | 0 | 0 |
| | U.V. lighe | 77° F./25° C. | 0 | 0 | 0 | 0 | 0 | 0 | 0 | 0 |
| 8 weeks | 0° C. | 77° F./25° C. | 0 | 0 | 0 | 0 | 0 | 0 | 0 | 0 |
| | 25° C. | 77° F./25° C. | 0 | 0 | 0 | 0 | 0 | 0 | 0 | 0 |
| | 37° C. | 77° F./25° C. | 0 | 0 | 0 | 0 | 0 | 0 | 0 | 0 |
| | 46° C. | 77° F./25° C. | 0 | 0 | 0 | 0 | 0 | 0 | 0 | 0 |
| | 55° C. | 77° F./25° C. | 0 | 0 | 0 | 0 | 0 | 0 | 0 | 0 |
| | F.L. light | 77° F./25° C. | 0 | 0 | 0 | 0 | 0 | 0 | 0 | 0 |
| 12 weeks | 0° C. | 77° F./25° C. | 0 | 0 | 0 | 0 | 0 | 0 | 0 | 0 |
| | 25° C. | 77° F./25° C. | 0 | 0 | 0 | 0 | 0 | 0 | 0 | 0 |
| | 37° C. | 77° F./25° C. | 0 | 0 | 0 | 0 | 0 | 0 | 0 | 0 |
| | 46° C. | 77° F./25° C. | 0 | 0 | 0 | 0 | 0 | 0 | 0 | 0 |
| | 55° C. | 77° F./25° C. | 0 | 0 | 0 | 0 | 0 | 0 | 0 | 0 |
| | F.L. light | 77° F./25° C. | 0 | 0 | 0 | 0 | 0 | 0 | 0 | 0 |

| | | Test item | | | | | | |
|---|---|---|---|---|---|---|---|---|
| | | Color | | Smell | | | | |
| Time interval | Condition | Comparative Example 1 | Comparative Example 2 | Example 1 | Example 2 | Example 3 | Comparative Example 1 | Comparative Example 2 |
| Initial test condition | | Light Blue | Light Blue | N/A | N/A | N/A | N/A | N/A |
| 1 week | 0° C. | 0 | 0 | 0 | 0 | 0 | 0 | 0 |

TABLE 3-continued

Stability Test Results of the Composition for Makeup Removal in Examples
1-3 and the Makeup Removing Products in Comparative Examples 1-2

|  |  |  |  |  |  |  |  |  |
|---|---|---|---|---|---|---|---|---|
|  | 25° C. | 0 | 0 | 0 | 0 | 0 | 0 | 0 |
|  | 37° C. | 0 | 0 | 0 | 0 | 0 | 0 | 0 |
|  | 46° C. | 0 | 0 | 0 | 0 | 0 | 0 | 0 |
|  | 55° C. | 0 | 0 | 0 | 0 | 0 | 0 | 0 |
|  | F.L. light | 0 | 0 | 0 | 0 | 0 | 0 | 0 |
|  | U.V. lighe | 0 | 0 | 0 | 0 | 0 | 0 | 0 |
| 2 weeks | 0° C. | 0 | 0 | 0 | 0 | 0 | 0 | 0 |
|  | 25° C. | 0 | 0 | 0 | 0 | 0 | 0 | 0 |
|  | 37° C. | 0 | 0 | 0 | 0 | 0 | 0 | 0 |
|  | 46° C. | 0 | 0 | 0 | 0 | 0 | 0 | 0 |
|  | 55° C. | 0 | 0 | 0 | 0 | 0 | 0 | 0 |
|  | F.L. light | 0 | 0 | 0 | 0 | 0 | 0 | 0 |
|  | U.V. lighe | 0 | 0 | 0 | 0 | 0 | 0 | 0 |
| 4 weeks | 0° C. | 0 | 0 | 0 | 0 | 0 | 0 | 0 |
|  | 25° C. | 0 | 0 | 0 | 0 | 0 | 0 | 0 |
|  | 37° C. | 0 | 0 | 0 | 0 | 0 | 0 | 0 |
|  | 46° C. | 0 | 0 | 0 | 0 | 0 | 0 | 0 |
|  | 55° C. | 0 | 0 | 0 | 0 | 0 | 0 | 0 |
|  | F.L. light | 0 | 0 | 0 | 0 | 0 | 0 | 0 |
|  | U.V. lighe | 0 | 0 | 0 | 0 | 0 | 0 | 0 |
| 8 weeks | 0° C. | 0 | 0 | 0 | 0 | 0 | 0 | 0 |
|  | 25° C. | 0 | 0 | 0 | 0 | 0 | 0 | 0 |
|  | 37° C. | 0 | 0 | 0 | 0 | 0 | 0 | 0 |
|  | 46° C. | 0 | 0 | 0 | 0 | 0 | 0 | 0 |
|  | 55° C. | 0 | 0 | 0 | 0 | 0 | 0 | 0 |
|  | F.L. light | 0 | 0 | 0 | 0 | 0 | 0 | 0 |
| 12 weeks | 0° C. | 0 | 0 | 0 | 0 | 0 | 0 | 0 |
|  | 25° C. | 0 | 0 | 0 | 0 | 0 | 0 | 0 |
|  | 37° C. | 0 | 0 | 0 | 0 | 0 | 0 | 0 |
|  | 46° C. | 0 | 0 | 0 | 0 | 0 | 0 | 0 |
|  | 55° C. | 0 | 0 | 0 | 0 | 0 | 0 | 0 |
|  | F.L. light | 0 | 0 | 0 | 0 | 0 | 0 | 0 |

Determination of the level of change: "0" = no significant change, "1" = slight change, "2" = significant change, "3" = severe change.

The above stability test results show that after three months of testing, the appearance and smell of the composition for makeup removal prepared in Examples 1-3 have no significant change, indicating that the composition for makeup removal prepared with the formula of the present invention has good stability.

Density Determination:

a density test was conducted on the makeup removing gel products prepared in Examples 4-6 and the makeup removing products prepared in Comparative Examples 1-2. The test results are shown in Table 4.

TABLE 4

Density Test Results of the Makeup Removing
Gel Products in Examples 4-6 and the Makeup
Removing Products in Comparative Examples 1-2

| Test item | Example 4 | Example 5 | Example 6 | Comparative Example 1 | Comparative Example 2 |
|---|---|---|---|---|---|
| Density (g/cm³) | 1.05 | 1.04 | 1.02 | 0.89 | 0.98 |

The above density test results show that the density range of the makeup removing gel products prepared with the formula of the present invention is between 1.0-1.05 g/cm³, while the density of the product in Comparative Example 1 is 0.89 g/cm³, and the density of the product in Comparative Example 2 is 0.98 g/cm³.

pH Value Test:

a pH value test was conducted with the Shanghai Leici PHS-2F pH meter on the makeup removing gel products prepared in Examples 4-6 and the products prepared in Comparative Examples 1-2 based on GB/T 13531.1. The test results are shown in Table 5.

TABLE 5 pH Value Test Results of the Makeup Removing
Gel Products in Examples 4-6 and the Makeup
Removing Products in Comparative Examples 1-2

| Test item | Example 4 | Example 5 | Example 6 | Comparative Example 1 | Comparative Example 2 |
|---|---|---|---|---|---|
| pH value | 5.8 | 5.9 | 5.89 | Oil-based, untestable | 6.8 |

The above pH value test results show that the pH value range of the makeup removing gel products prepared with the formula of the present invention is 5.5-6.0, which is close to that of human skin in a weakly acidic environment, thereby avoiding irritation to human skin during use.

Moisturizing Effect Test:

a moisturizing effect test was conducted on the makeup removing gel products prepared in Examples 4-6, the products prepared in Comparative Examples 1-2, and distilled water. A total of 18 subjects (6 males and 12 females) aged 21 to 49 were selected (randomly) for testing and divided into 6 groups of 3 persons in each group. The 3 persons in each group used the same experimental sample to clean their skin. The test method was as follows: first, the MS-7003 skin tester was used to detect the moisture on the skin surfaces of the subjects; then, the 3 persons in each group used the same experimental sample to clean their skin; after 10 min and 30 min respectively, the moisture on the skin surfaces of the subjects was detected again, and the average score was calculated and recorded. The test results are shown in Table 6.

TABLE 6

Moisturizing Effect Test Results of the Makeup Removing Gel Products in Examples 4-6, the Makeup Removing Products in Comparative Examples 1-2, and Distilled Water

|  | Example 4 | Example 5 | Example 6 | Comparative Example 1 | Comparative Example 2 | Distilled water |
|---|---|---|---|---|---|---|
| Original skin moisture | 30% | 30% | 30% | 30% | 30% | 30% |
| Initial moisture | 75% | 75% | 76% | 35% | 65% | 65% |
| Moisture after 10 min | 65% | 65.5% | 65.8% | 35% | 56.5% | 45% |
| Moisture after 20 min | 49% | 50% | 51% | 30% | 35% | 34% |
| Moisture after 30 min | 39% | 40% | 44% | 30% | 34% | 30% |

The above moisturizing effect test results show that the makeup removing gel products prepared by the present invention have a better moisturizing effect than the products prepared in the comparative examples, indicating that the raw materials of the present invention are reasonably matched and have a desirable moisturizing effect.

Makeup Removal Effect Test:

a makeup removal effect test was conducted on the makeup removing gel products prepared in Examples 4-6 and the products prepared in Comparative Examples 1-2. A total of 15 subjects (5 males and 10 females) aged 21 to 49 were selected (randomly) for testing and divided into 5 groups of 3 persons in each group. The 3 persons in each group used the same experimental sample to remove makeup. The test method was as follows: first, BB cream, eyeliner, and mascara were applied on the inner arms of the 15 subjects for 4 h; then, the makeup area was wiped 3 times with 2 grams of the experimental sample; finally, the makeup area was cleaned with water. The subjects were required to rate how they felt. A 1-10 rating scale was adopted, with 1 being the worst and 10 being the best. The higher the score, the better the corresponding product's makeup removal capability, ease of washability, and comfort after use. The subjects evaluated the samples' makeup removing capability, ease of washability, and comfort after use. The average score was calculated and recorded. The test results are shown in Table 7.

Figure 2:
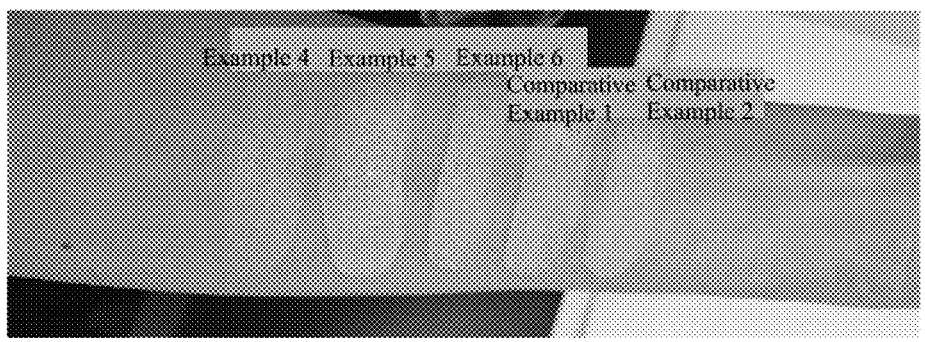
FIG. 2 shows appearances of a subject's inner arm after applying non-removing BB cream for 4 h before makeup removal, as well as during and after makeup removal using the products prepared in Examples 4-6 and in Comparative Examples 1 and 2.
Figure 2:
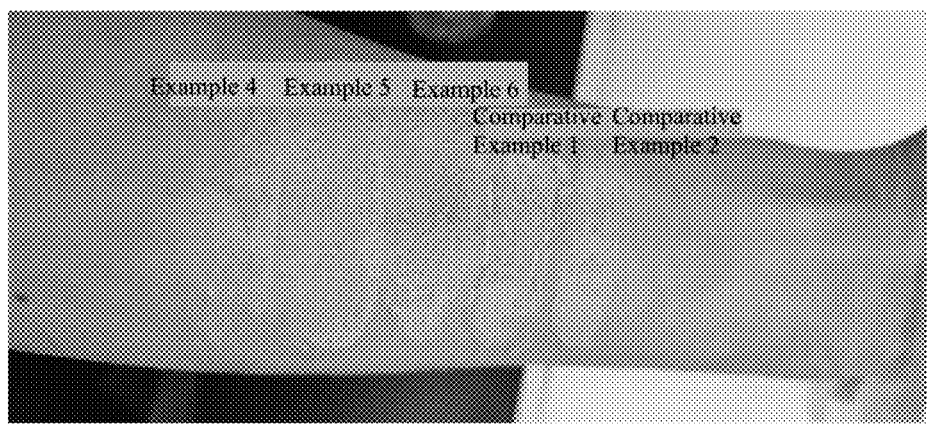
Figure 2:
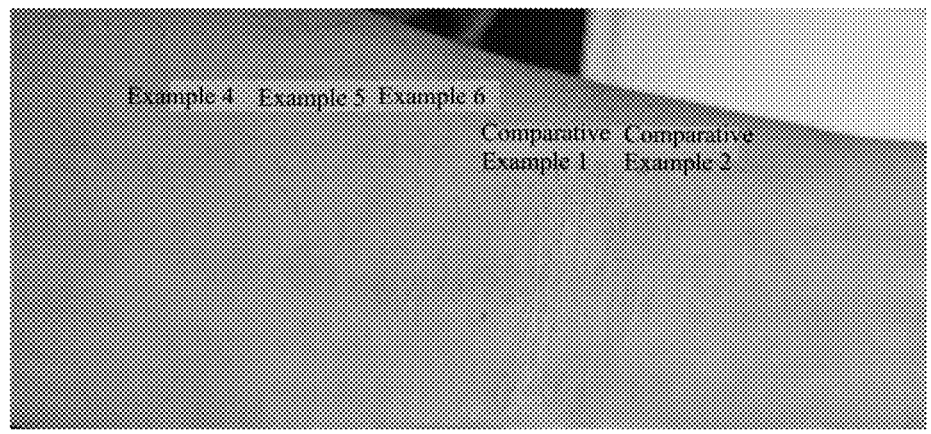
Figure 3:
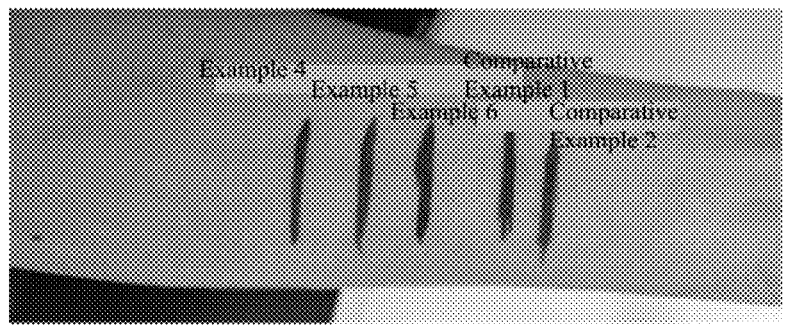
FIG. 3 shows appearances of a subject's inner arm after applying a long-lasting eyeliner for 4 h before makeup removal, as well as during and after makeup removal using the products prepared in Examples 4-6 and in Comparative Examples 1 and 2.
Figure 3:
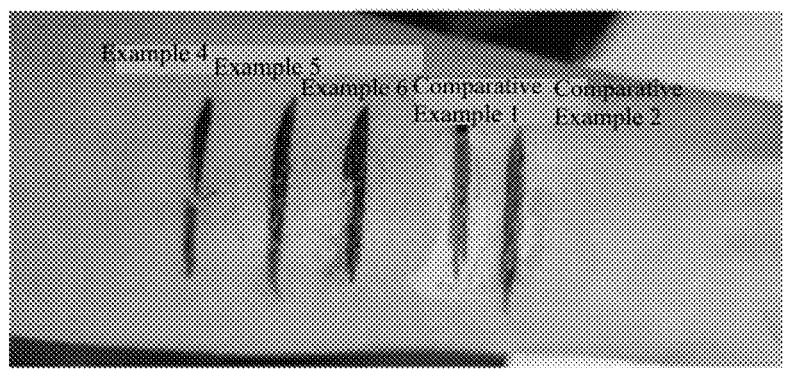
Figure 3:
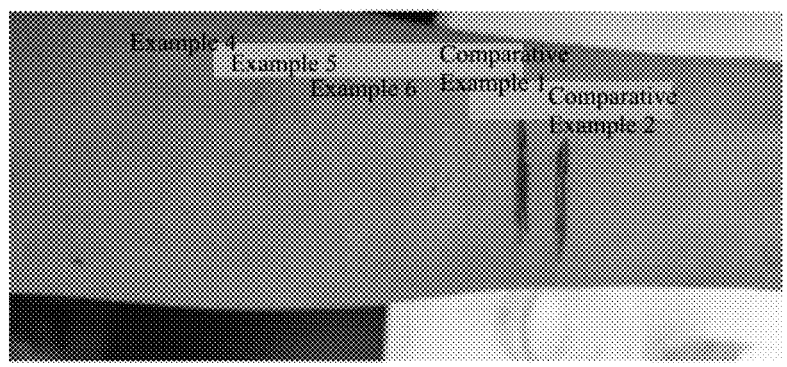
Figure 4:
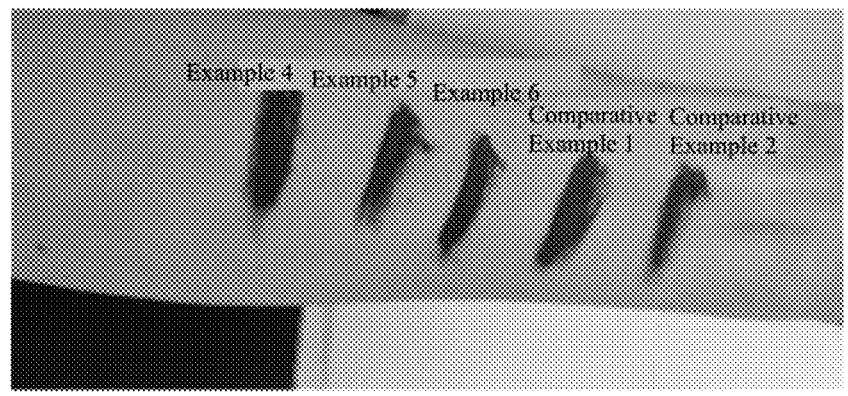
FIG. 4 shows appearances of a subject's inner arm after applying long-lasting mascara for 4 h before makeup removal, as well as during and after makeup removal using the products prepared in Examples 4-6 and Comparative Examples 1 and 2.
Figure 4:
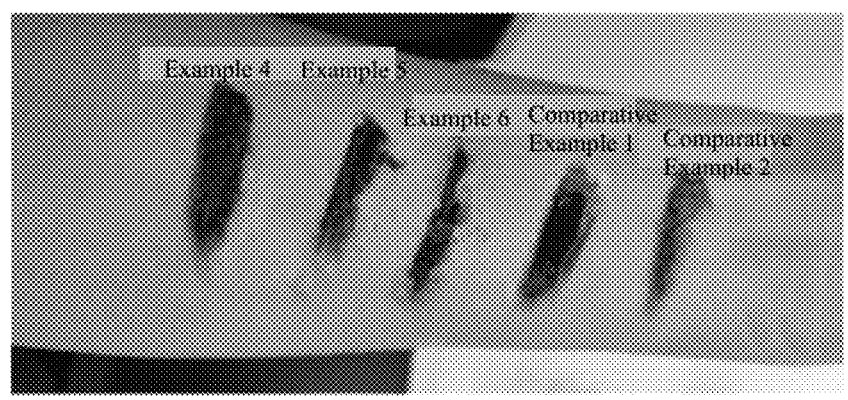
Figure 4:
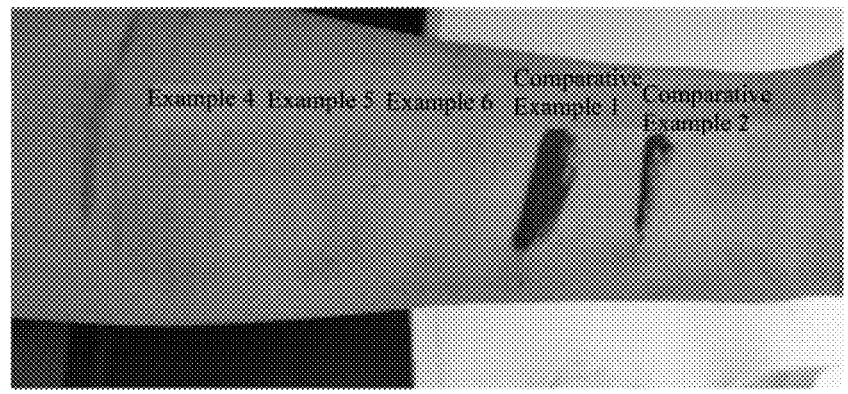

In addition, BB cream, eyeliner, and mascara were applied on the inner arm of a selected subject for 4 h. Then, the makeup removing gel products prepared by the present invention and the make removing products in Comparative Examples 1-2 were used respectively to remove the makeup, and a camera was used to take photos under the same lighting conditions before, during, and after makeup removal. The comparison of the photos taken before and after makeup removal is shown in FIGS. 2, 3, and 4.

TABLE 7

Makeup Removal Effect Test Results of the Makeup Removing Gel Products in Examples 4-6 and the Makeup Removing Products in Comparative Examples 1-2

| Test item | Makeup removing capability | Ease of washability | Comfort after use | Moisturizing effect |
|---|---|---|---|---|
| Example 4 | 9.8 | 9.9 | 9.6 | 9.5 |
| Example 5 | 9.8 | 9.9 | 9.7 | 9.6 |
| Example 6 | 9.9 | 9.9 | 9.6 | 9.5 |
| Comparative Example 1 | 9.6 | 9.4 | 9.5 | 9.5 |
| Comparative Example 2 | 9.1 | 9.8 | 9.4 | 9.3 |

The above makeup removing effect test results show that the makeup removing gel products prepared by the present invention are rated higher than the products in the comparative examples in terms of makeup removing capability, ease of washability, comfort after use, and moisturizing effect, indicating that the makeup removing gel products prepared by the present invention have better makeup removing capability, ease of washability, comfort after use, and moisturizing effect.

Further, it can be seen from the comparison of FIGS. 2, 3, and 4 that when the same makeup product was removed from the same part of the same subject, compared with the products in Comparative Examples 1-2, the makeup removing gel products of the present invention left fewer traces of makeup residue and color residue on the skin after makeup removal, and the color residue was not obvious, indicating that the makeup removing gel products of the present invention have a significantly better makeup removing effect than the products in the comparative examples.

The above embodiments are intended to help understand the principle of the embodiments of the present invention; however, the implementation of the present invention is not limited thereby. Any modification, equivalent replacement, or improvement made without departing from the spirit and principle of the present invention shall fall within the protection scope of the present invention.

What is claimed is:

1. A composition for makeup removal, comprising, in parts by weight, the following components: 15-30 parts of a thickening agent, 10-30 parts of sodium methyl cocoyl taurate, 10-50 parts of sodium lauroyl glutamate, 5-10 parts of sodium lauryl sulfate, 20-30 parts of a filling agent, 1-5 parts of microcrystalline cellulose, 0.1-0.2 parts of sodium hyaluronate, 0.3-0.5 parts of essence, and 0-0.5 parts of pigment; wherein the composition is free of water.

2. The composition for makeup removal of claim 1, comprising, in parts by weight, the following components: 20-25 parts of the thickening agent, 15-25 parts of sodium methyl cocoyl taurate, 20-30 parts of sodium lauroyl glutamate, 6-8 parts of sodium lauryl sulfate, 23-27 parts of the filling agent, 2-4 parts of microcrystalline cellulose, 0.1-0.2 parts of sodium hyaluronate, 0.3-0.4 parts of essence, and 0-0.1 parts of pigment.

3. The composition for makeup removal of claim 1, wherein the thickening agent is selected from at least one of sodium polyacrylate and sodium polyacrylate grafted with starch.

4. The composition for makeup removal of claim 1, wherein the filling agent is selected from at least one of magnesium sulfate, sodium sulfate, and urea.

5. A makeup removing gel containing the composition for makeup removal according to claim 1, wherein the makeup removing gel is prepared by evenly mixing, in parts by weight, 1-2 parts of the composition for makeup removal and 10-20 parts of water to form a gel with a density of 1.0-1.05 $g/cm^2$.

6. The composition for makeup removal of claim 1, wherein the composition is free of oil.

* * * * *